United States Patent
Naismith et al.

(10) Patent No.: US 9,391,797 B2
(45) Date of Patent: Jul. 12, 2016

(54) DYNAMIC HOST PROFILES FOR OPTION MODULES

(75) Inventors: Ronald H. Naismith, North Andover, MA (US); William E. LeRette, Tewksbury, MA (US); Achim Zimmermann, Dietzenbach (DE)

(73) Assignee: Schneider Electric USA, Inc., Andover, MA (US)

( * ) Notice: Subject to any disclaimer, the term of this patent is extended or adjusted under 35 U.S.C. 154(b) by 535 days.

(21) Appl. No.: 12/964,406

(22) Filed: Dec. 9, 2010

(65) Prior Publication Data

US 2012/0151017 A1 Jun. 14, 2012

(51) Int. Cl.
| | | |
|---|---|---|
| *G06F 15/177* | (2006.01) | |
| *H04L 12/40* | (2006.01) | |
| *H04L 12/24* | (2006.01) | |
| *H04L 12/54* | (2013.01) | |
| *H04L 29/08* | (2006.01) | |

(52) U.S. Cl.
CPC ...... *H04L 12/40169* (2013.01); *H04L 12/5692* (2013.01); *H04L 41/082* (2013.01); *H04L 67/12* (2013.01); *H04L 67/303* (2013.01); *H04L 41/0226* (2013.01); *H04L 2012/4026* (2013.01); *H04L 2012/40221* (2013.01)

(58) Field of Classification Search
CPC .......... H04L 2012/4026; H04L 12/5692; H04L 41/0226; H04L 41/082; H04L 67/303
USPC ................................................. 709/220, 221
See application file for complete search history.

(56) References Cited

U.S. PATENT DOCUMENTS

| 6,233,626 | B1 * | 5/2001 | Swales et al. .................... 710/11 |
|---|---|---|---|
| 7,990,974 | B1 * | 8/2011 | Gmuender et al. ........... 370/392 |
| 2003/0236937 | A1 * | 12/2003 | Barros De Almeida et al. ............................. 710/305 |
| 2006/0074952 | A1 * | 4/2006 | Rothman et al. .............. 707/101 |
| 2007/0067458 | A1 * | 3/2007 | Chand .......................... 709/226 |
| 2007/0088518 | A1 * | 4/2007 | Braun .......................... 702/108 |

(Continued)

FOREIGN PATENT DOCUMENTS

| CN | 1416078 A | 5/2003 |
|---|---|---|
| CN | 1937559 A | 3/2007 |

(Continued)

OTHER PUBLICATIONS

Sep. 6, 2015—(CN) Office Action—App 201180064723.2—Eng Tran.

*Primary Examiner* — Oleg Survillo
(74) *Attorney, Agent, or Firm* — Banner & Witcoff, Ltd.

(57) ABSTRACT

Aspects of the invention support different products having a host device and a communications device. The host device may interact with the communications device to exchange messages containing data objects over a fieldbus network for transporting messages containing data objects. Read/write requests to the fieldbus data objects may be answered locally in the communications device, or the fieldbus data object may be mapped to host data when host access is required. The communications device stores a profile image associated with a designated host type, so that the communications device may map the data object to host data for the host device and then exchange the host data with the host device. The communications device may subsequently interact with a different host type if a corresponding profile image is downloaded to the memory device.

18 Claims, 6 Drawing Sheets

(56) References Cited

U.S. PATENT DOCUMENTS

| | | |
|---|---|---|
| 2007/0186011 A1 | 8/2007 | Batke et al. |
| 2007/0282463 A1* | 12/2007 | Hodson et al. ............... 700/20 |
| 2009/0265020 A1* | 10/2009 | Blair et al. .................... 700/19 |
| 2010/0097336 A1* | 4/2010 | Gomes et al. ............... 345/173 |
| 2010/0217843 A1* | 8/2010 | Dehaan et al. .............. 709/221 |
| 2012/0054599 A1* | 3/2012 | Nixon et al. ................. 715/236 |
| 2012/0062577 A1* | 3/2012 | Nixon .......................... 345/522 |
| 2012/0093242 A1* | 4/2012 | Wallace et al. .............. 375/259 |
| 2012/0151321 A1* | 6/2012 | Naismith et al. ............ 715/234 |
| 2012/0210315 A1* | 8/2012 | Kapadekar et al. .......... 717/172 |
| 2012/0284377 A1* | 11/2012 | Von Stein et al. ........... 709/221 |

FOREIGN PATENT DOCUMENTS

| | | |
|---|---|---|
| EP | 1420315 A1 | 5/2004 |
| EP | 1816530 A1 | 8/2007 |

* cited by examiner

DYNAMIC HOST PROFILES FOR OPTION MODULES

BACKGROUND

With the automation of industrial processes and systems, e.g., control of machinery on factory assembly lines, control of chemical processes, control of heating, ventilating, and air conditioning (HVAC) systems, and control of lighting fixtures, different processes often use different products to monitor and control the different processes and systems. For example, different firmware images and/or different product references may be used to provide the communication for different products with different operating environments. A product typically includes a controlling device with a communications interface that interacts with a specific communications environment. The communications environment may include a fieldbus supporting a designated protocol, e.g., Modbus/TCP or EtherNet/IP so that the product can interact with remote devices. With traditional systems, a different communications interface is often needed for different communications environments. Consequently, each communications environment often requires different firmware and/or hard-coded support, thus resulting in additional development effort for each newly-supported product, even though there may be substantial commonality among products.

SUMMARY

An aspect of the invention provides apparatuses, computer-readable media, and methods for supporting different products in an automation and control system that include a host device and a communications device. The host device may interact with the communications device to exchange messages containing data objects over a fieldbus network for transporting messages containing data objects. Read/write requests to the fieldbus data objects may be answered locally in the communications device or the fieldbus data object may be mapped to host data when host access is required.

With another aspect of the invention, a communications device may be configured as an option module to plug into a host device for different products without a firmware change. A downloadable host profile image, which may be provided by the host device or a separate development system, enables the communications device to communicate over one of a plurality of different fieldbus networks by representing the data available in a host as the fieldbus data objects for the specific fieldbus network.

With another aspect of the invention, a communications device includes a network interface that interfaces with a fieldbus network, a memory device, and a processing device. The network interface may exchange a message containing a network data object from a networked device. The memory device stores a profile image associated with a designated host type, so that the processing device may map the network data object to host data for the host device in accordance with the first profile image. The processing device may then exchange the host data with the host device. The communications device may subsequently interact with a different host type if a corresponding profile image is downloaded to the memory device.

With another aspect of the invention, a profile image may be downloaded to a communications device from the host device or from a separate development system.

With another aspect of the invention, a profile image includes one or more configuration data objects mapping to host data that may be obtained from a host device or from a development system. The communications device then configures itself in accordance with the configuration data object.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein.

DETAILED DESCRIPTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

As used herein, the term "data object" may be defined as any data entity that can be manipulated by the commands of a programming language, such as a value, variable, function, or data structure. For example, in the domain of object-oriented programming, a data object typically denotes a compilation of attributes (e.g., object elements) and behaviors (methods or subroutines) encapsulating an entity.

With traditional systems, different firmware images and/or different product references are often used to provide network communication for different hosts, where a host can assume different forms including programmable logic controllers, protection relays, motor drives, HVAC controllers, and the like.

With an aspect of the invention, the term "product" includes a host device (e.g., a circuit) and a communications device. The communications device interacts with the host device to provide communications with a fieldbus network. Messages sent on the fieldbus network may include data objects. Read/write requests to the fieldbus data objects may be answered locally in the communications device, or the fieldbus data objects may be mapped to host data when host access is required. mapped to host data.

With another aspect of the invention, a communications device may plug into a host device for different products without a firmware change. A downloadable host profile image, which may be provided by the host device or a separate development system, enables the communications device to communicate on a fieldbus network by representing the data available in a host as the fieldbus data objects for the specific fieldbus network. Different fieldbus networks may be supported, including Modbus TCP, EtherNet/IP, DeviceNet, Profibus, Profinet, BACnet MS/TP, and so forth.

Figure 1:
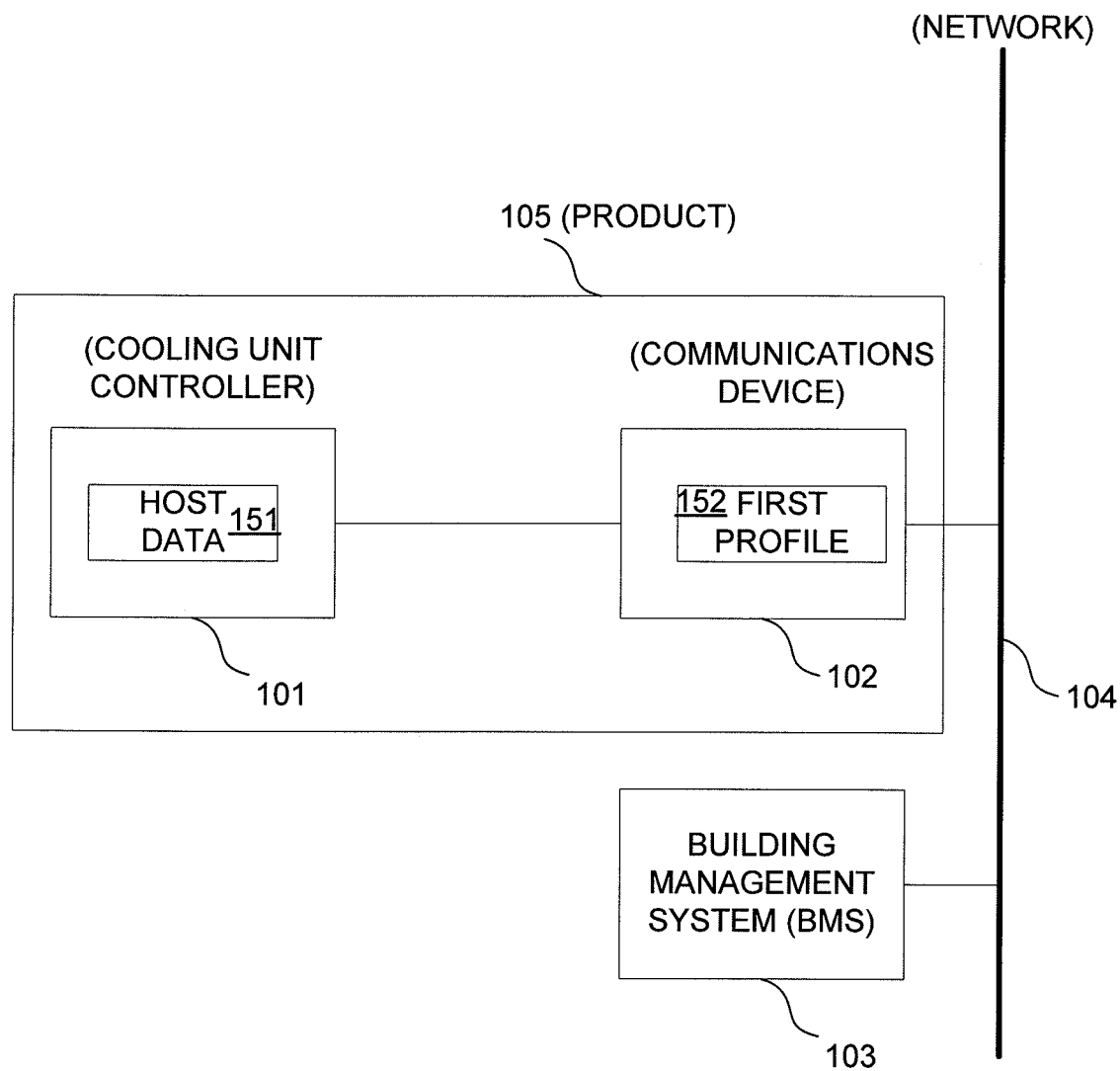
FIG. 1 shows an example of a communications device interacting with a cooling unit controller and a network in accordance with an embodiment of the invention.

FIG. 1 shows an example of a cooling unit controller 101 and building management system (BMS) 103 communicating through a communications device 102 over a fieldbus network 104 in accordance with an embodiment of the invention. For example, the winter and summer temperature setpoints may be set by BMS 103 through communications device 102. A cooling unit (not shown) may send alarms, such as high or low temperature alarms, to BMS 103 through a communications interface coupled to network 104.

In the following description, cooling unit controller 101 may be referred as a host device, and the combination of the communications device 102 and host device 101 may be referred as product 105.

In order to control and monitor a cooling unit, communications device 102 exchanges messages to and from BMS 103, in which a message contains data that is typically organized as data objects. To distinguish that a data object is exchanged over fieldbus network 104, the data object is denoted as a network data object. As will be discussed later, some data objects may be associated with the configuration of communications device 102, and are denoted as configuration data objects.

In order to map a network data object to host data 151, communications device 102 accesses profile image 152, which is based on the characteristics of cooling unit controller 101. In order to provide host data 151 to building management system 103, communications device 102 may need to know the format and memory location of host data 151 and how to access host data 151. As will be discussed, profile image 152 may provide this mapping information.

Figure 2:
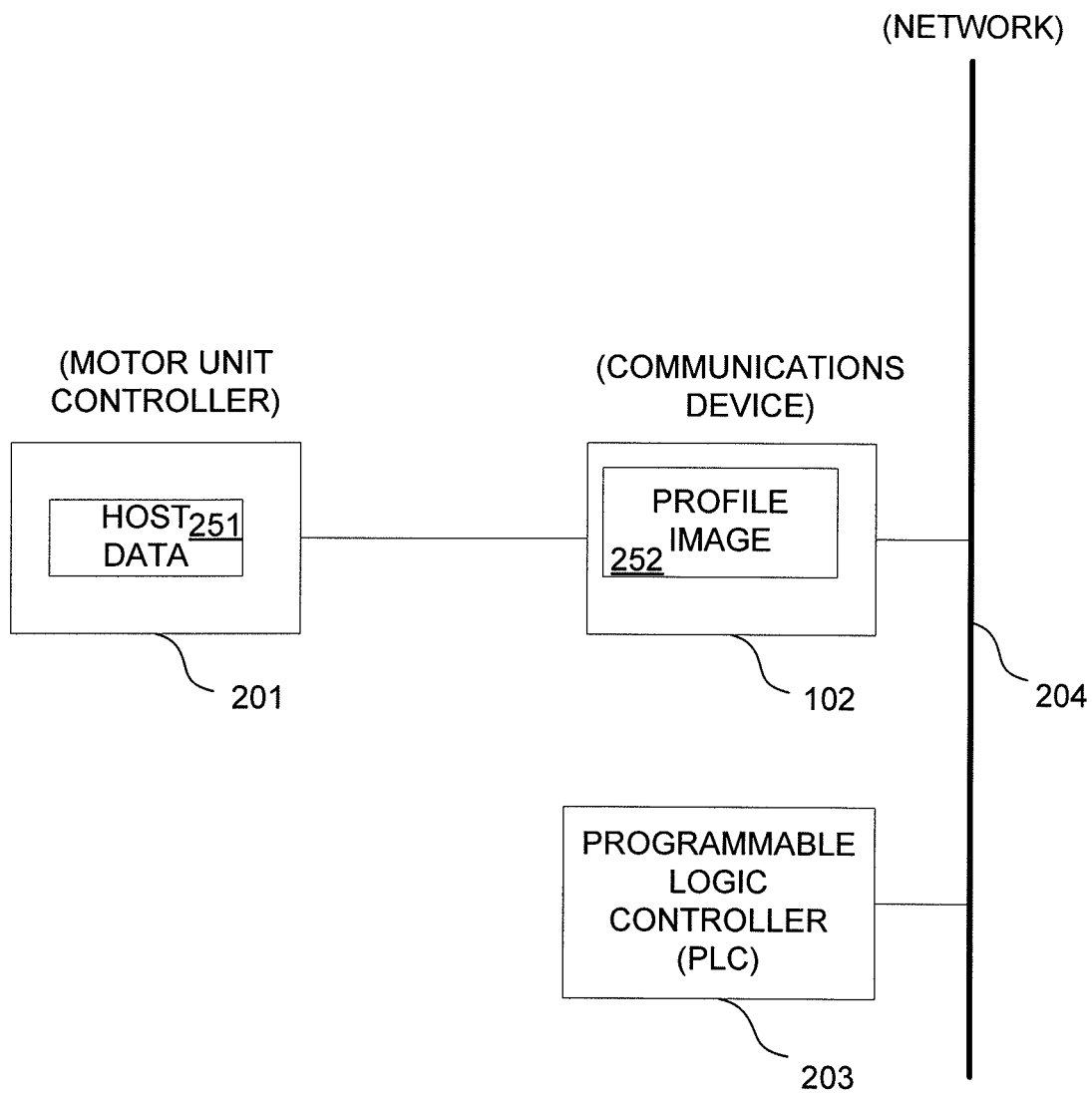
FIG. 2 shows an example of the communications device shown in FIG. 1 interacting with a motor controller and a network in accordance with an embodiment of the invention.

FIG. 2 shows an example of motor unit controller 201 and programmable logic controller (PLC) 203 communicating through the same communications device 102 over fieldbus network 204 in accordance with an embodiment of the invention. (As shown in FIGS. 1 and 2, communications device 102 may support both products.) Motor unit controller 201 typically has different operating characteristics than cooling unit 101, and fieldbus network 204 may utilize the same or different communications protocols as fieldbus network 104. Consequently, network data objects exchanged over fieldbus network 204 may be different than network data objects exchanged over fieldbus network 104.

Figure 4:
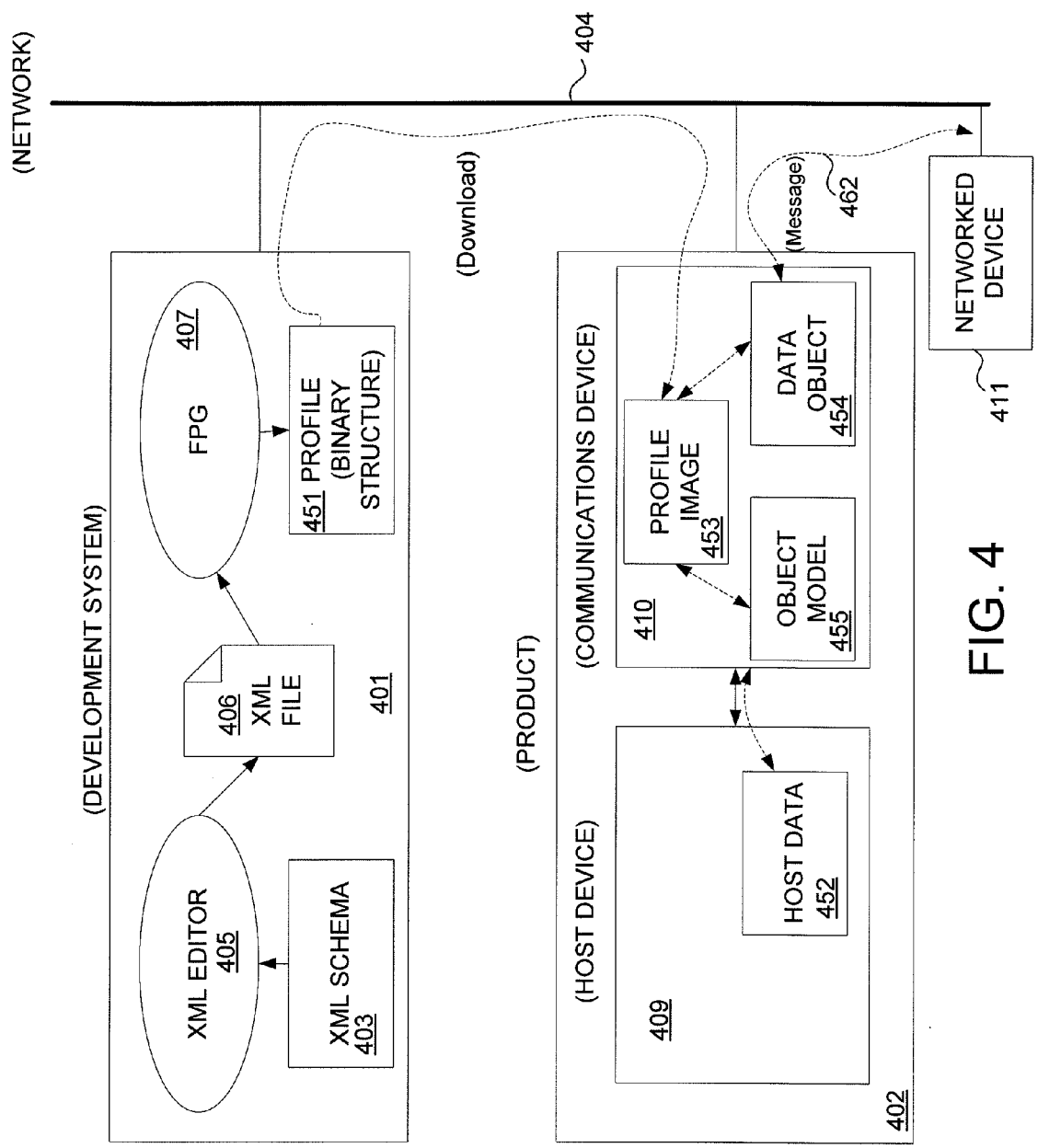
FIG. 4 shows a product in which a host profile is downloaded to a communications device from a development system in accordance with an embodiment of the invention.

The communications device (e.g., device 102) may be the same device for both FIGS. 1 and 2. In order to match motor unit controller 201, profile image 252 is downloaded into communications device 102. Consequently, communications device 102 is able to map a network data object to host data 251. As will be further discussed, profile image 152 or profile image 252 may be downloaded from various sources, including host device (e.g., cooling unit controller 101 of FIG. 1 or motor unit controller 201 of FIG. 2) or a separate development system 401 as shown in FIG. 4.

Figure 3:
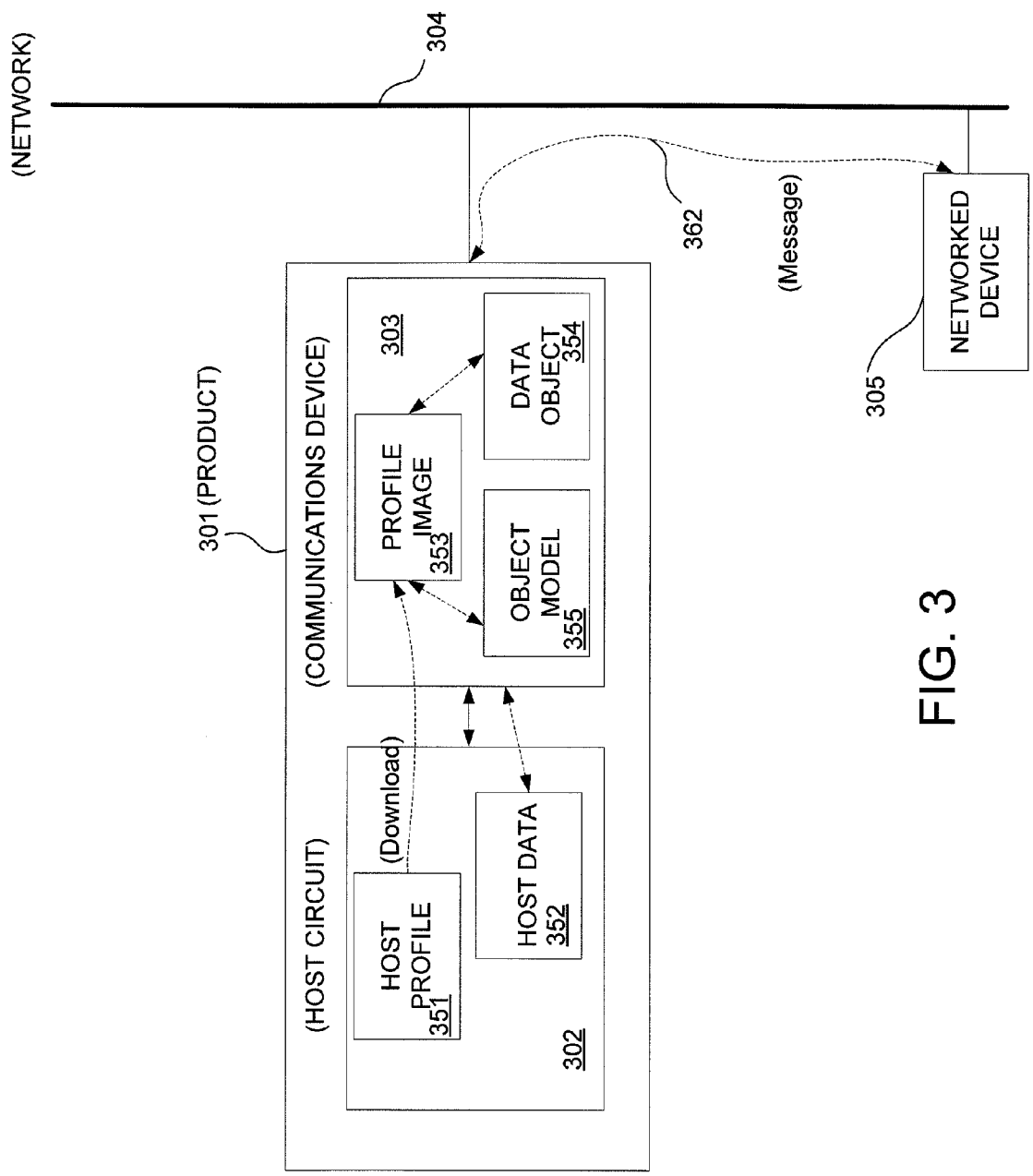
FIG. 3 shows a product in which a host profile is downloaded to a communications device from a host circuit in accordance with an embodiment of the invention.

FIG. 3 shows product 301 in which profile image 353 is downloaded to communications device 303 from host profile 351 that is stored in host circuit (host device) 302 in accordance with an embodiment of the invention.

With traditional systems, a communications device may be required for different products, have different firmware, or have hard-coded support for each supported type of host. With some traditional systems, each host device may have a server for every fieldbus network that is supported so that a communications device may send fieldbus requests directly to the host device and send responses from the host device directly on the fieldbus network without translation into another format in order to communicate with the host device. Such an approach may be very costly both in terms of resources needed in hosts and stack licenses.

Referring to FIG. 3, communications device 303 may be used with many different types of hosts (corresponding to different products) for network connectivity without a different firmware image or executable image being generated for each host or without hardcoded support of hosts being known at development time. Consequently, a new host type may be supported after communications device 303 is released without updating the firmware on communications device 303.

Host circuit 302 may be a computing device, including a programmable logic controller (PLC), input/output (I/O) block, protection relay, and the like. With some embodiments, host circuit 302 may have a slot that accommodates communications device 302 (e.g., an option module), which provides a communications interface for fieldbus network 304. Embodiments may support a specific type of fieldbus network from different types of fieldbus networks having different physical layers and different protocols. Some examples of fieldbus networks include (but not limited to) Modbus/TCP, EtherNet/IP, DeviceNet, Profibus, Profinet, and BACnet MS/TP.

Traditional systems often use a different type of communications device 303 for each type of host device. However, with an aspect of the invention, different profile images may be downloaded into communications device 303 to support different products (corresponding to different host devices and fieldbus networks). With the embodiment shown in FIG. 3, profile image 353 includes a mapping of fieldbus data object 354, which represents data contained in message 362 sent to or received from networked device 305 over fieldbus network 304, to host device 302. Host data 352 is typically accessed from host device 302 at location(s) of memory with a specified data format. Fieldbus data object 354 maps to host data 352 based on object model 355 as will be further discussed in conjunction with FIG. 5. For example, with motor unit controller 201 as shown in FIG. 2, fieldbus data object 354 may include the current motor speed and duty cycle value, where each parameter may be stored in different memory locations in host device 302 with different data formats.

With embodiments of the invention, fieldbus data object 354 may be sent to or received from networked device 305 over fieldbus network 304. Consequently, host data 352 may be mapped to fieldbus data object 354 (by reading memory in host device 302) or mapped from fieldbus data object 354 (by reading and writing memory in host device 302).

Figure 6:
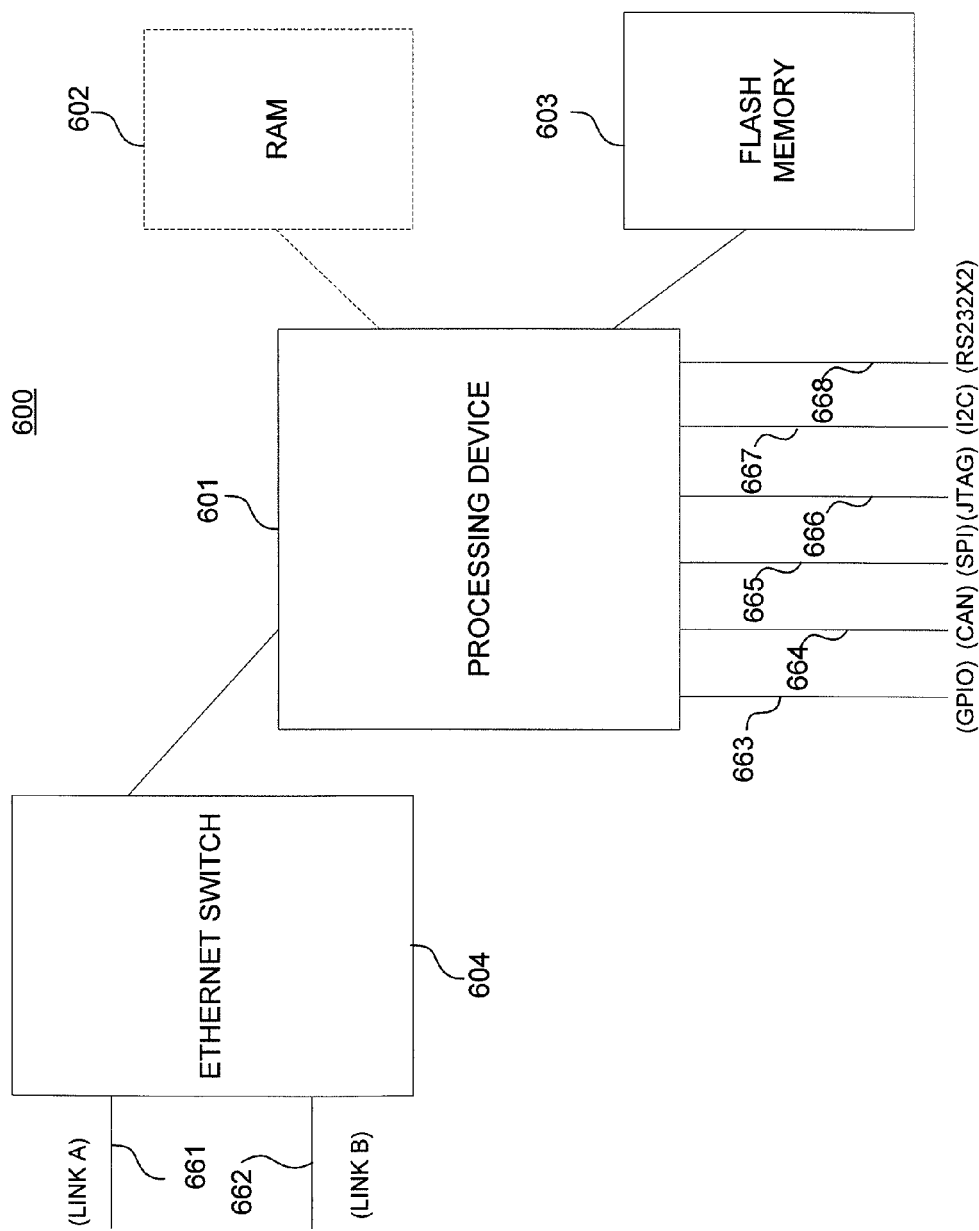
FIG. 6 shows a block diagram of a communications device in accordance with an embodiment of the invention.

With embodiments of the invention, a host profile may be presented in different formats including, but not limited to, Extensible Markup Language (XML) (that may be designated as a verbose format) and binary (that may be designated as a compact format). When stored as host profile 351 in host circuit 302 or as profile image 353 in communications device 303, the host profile typically has a binary format in order to reduce memory requirements and to avoid converting from the verbose format to the binary format whenever communications device 303 re-initializes. Moreover, processing devices (e.g., processing device 601 as shown in FIG. 6) typically use a binary format when mapping data objects to host data. However, as will be discussed with FIG. 4, a host profile may be constructed with a development system (e.g., a PC) where the host file is presented in a language (e.g., XML) for representing the data. The host profile is typically converted to binary format before exporting the host profile from the development system.

FIG. 4 shows product 402 in which profile 451 is downloaded to profile image 453 on communications device 410 from development system 401 in accordance with an embodiment of the invention. In contrast to the embodiment shown in FIG. 3, communications device 410 obtains profile image 453 from development system 401 rather than from host device 409. With the embodiments shown in FIG. 4, development system 401 downloads host profile 451 over fieldbus network 404. However, with some embodiments the downloading may occur over a direct communication connection between development system 401 and communications device 410 or profile image 453 may be placed a priori in the communications device 410 during the production by burning the profile into the non-volatile memory of the communications device 410.

With some embodiments, development system 401 may be based on a personal computer (PC); however, other computing platforms, e.g., an embedded processing device, mainframe computer, mobile terminal device, or cloud computing platform may be used.

With some embodiments, mapping between host data and fieldbus data objects are based on XML schema 403, which may be edited by a user through XML editor 405 to modify XML file 406. For example, a user may override a default value of one of the data components of a data object with a different value.

If communications device 410 uses a compact format for the host profile, fieldbus profile generator (FPG) 407 is used to convert from the verbose format of XML file 406 to the compact format of host profile 451.

With some embodiments, profile image 453 may be downloaded from host device 409 during an initialization process or from fieldbus network 404 using a protocol supported by fieldbus network 404 for downloading files, e.g., for FTP on IP networks.

Similar to the operation described with FIG. 3, different profile images may be downloaded into communications device 410 to support different products. Profile image 453 includes a mapping of fieldbus data object 454 (which represents data contained in message 462 sent or received from networked device 411 over fieldbus network 404) to host device 409. Fieldbus data object 454 maps to host data 452 based on object model 455.

Figure 5:
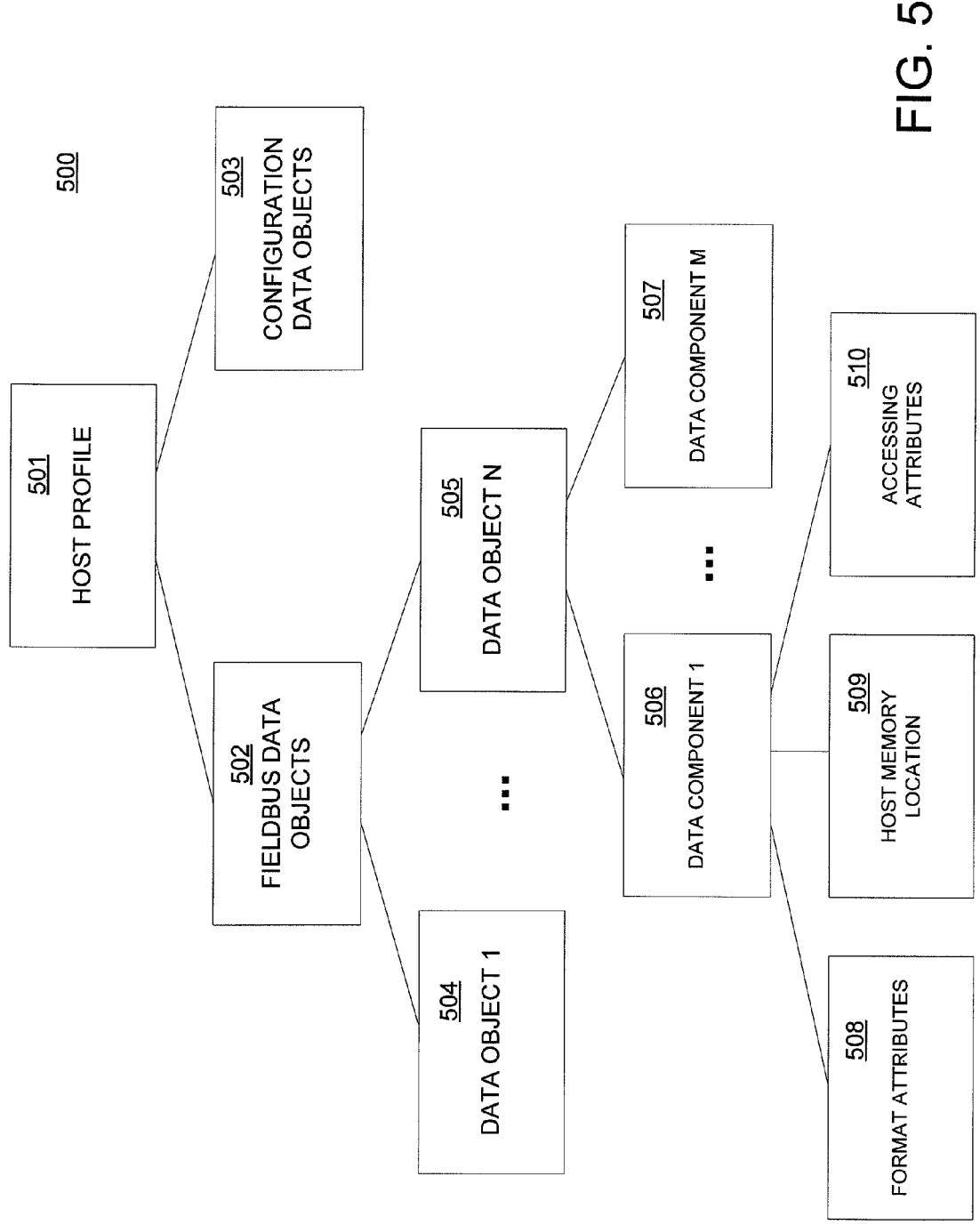
FIG. 5 shows a hierarchal representation of data objects that are associated with a product in accordance with an embodiment of the invention.

FIG. 5 shows hierarchical representation 500 of a data model for data objects that are associated with a product in accordance with an embodiment of the invention. Host profile 501 may represent fieldbus data objects 502 and/or configuration data objects 503. For example, fieldbus data objects 502 may include data objects 504 and 505. Data object 505 further comprises data components 506 and 507, where each data component represents a host data entity. Data component 507 is described by format attributes 508 (e.g., integer, floating point, or character), host memory location 509, and accessing attributes 510 (e.g., read only or read/write). Hierarchical representation 500 may be expanded for the other data objects in order to complete the data model (e.g., corresponding to data object model 355 as shown in FIG. 3).

With some embodiments, a processing device may use configuration data objects 503 to configure a communications device, network interface, or a connection between a communications device and a host device in order to communicate. For example, configuration data object 503 may include information about a specified protocol, port addresses, and data rates.

With some embodiments, hierarchical representation 500 may be expressed as an Extensible Markup Language (XML) schema (e.g., XML schema 403 as shown in FIG. 4). The XML schema typically provides the template or "rules" for the format of the host profile. When the XML schema is developed, the verbose host profile (e.g., XML file 406) is generated. If a product has a static or fixed data model, then the verbose host profile is typically developed once during development of the host profile. However, if the host device is programmable and the data model for the host device may change, then a mechanism may be added to the programming environment for the development system to export a verbose host profile. As previously discussed, the verbose host profile is then input to the fieldbus profile generator in order to convert the host profile to a binary format when the communications device does not support a runtime parser of XML.

As previously discussed, data objects may be descriptive of fieldbus objects. Moreover, according to an aspect of the invention, data objects may be descriptive of configuration settings, in which configuration data may be used locally by a communications device to configure itself. For example, the communications device may configure an IP address, a default gateway for Ethernet communications, the baud rate on the network, and a connection between the communications device and the host device.

FIG. 6 shows apparatus 600 representing communications device 303 or 410 as shown in FIGS. 3 and 4, respectively, in accordance with an embodiment of the invention. Processing device 601 may execute computer executable instructions from a computer-readable medium (e.g., memory 603) in order to provide communications over a fieldbus network and to map fieldbus data objects to host data. With some embodiments, processing device 601 may include a processor and an internal random access memory (RAM) 602. Memory 602 is typically used for temporary storage while memory 603 may comprise a flash memory for storing computer executable instructions and a profile image. However, computer storage media may include volatile and nonvolatile, removable and non-removable media implemented in any method or technology for storage of information such as computer readable instructions, data structures, program modules or other data. Computer storage media may include, but may not be limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 601. The executable instructions may carry out any or all of the method steps described herein.

Apparatus 600 may be implemented as one or more ASICs or other integrated circuits having instructions for performing operations as described in connection with one or more of any of the embodiments described herein. Said instructions may be software and/or firmware instructions stored in a machine-readable medium and/or may be hard-coded as a series of logic gates and/or state machine circuits in one or more integrated circuits and/or in one or more integrated circuits in combination with other circuit elements.

Apparatus 600 may support dual Ethernet links 661 and 662 to provide redundancy, typically used with a fieldbus network to monitor and control remote devices. Processing device 601 obtains the active Ethernet link through Ethernet switch 604. However, with some embodiments, a single port Ethernet device may be supported.

Apparatus 600 may also support other interfaces 663-668 that may be used for direct communications between a development system and a communications device or for supporting peripheral devices. Interfaces 663-668 may support different interface types that include General Purpose Input/Output (GPIO), Controller—Area Network (CAN), System Packet Interface (SPI), Joint Test Action Group (JTAG), Inter-Integrated Circuit (I2C), and Recommended Standard 232 (RS-232).

As can be appreciated by one skilled in the art, a computer system with an associated computer-readable medium containing instructions for controlling the computer system may be utilized to implement the exemplary embodiments that are disclosed herein. The computer system may include at least one computer such as a microprocessor, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method for converting data objects to a host data, the method comprising:
storing, in a memory device of a communications device, a first profile image of a plurality of profile images, wherein each profile image of the plurality of profile images is based on characteristics of a different host device and includes a different configuration data object and wherein each profile image is associated with a different host type and wherein each profile image is enabled for reconfiguring an existing firmware operating on the communications device without changing the existing firmware to a different firmware;
accessing, by the communications device, the first profile image from the memory device;
reconfiguring, by the communications device, the existing firmware operating on the communications device, without changing the existing firmware to a different firmware, in accordance with a configuration data object included in the first profile image;
exchanging a first message between the communications device and a first networked device communicatively coupled to the communications device via a network interface, the first message containing a first network data object and wherein the network interface is configured to interface with at least one fieldbus network and configured for exchanging at least the first message with the first network device via the at least one fieldbus network;
mapping, by the communications device in accordance with the configuration data object of the first profile image, the first network data object received from the first networked device to first host data utilizing characteristics of a first host device from the first profile image for exchange with the first host device, wherein the first host device is characterized by a first host type; and
exchanging the first host data between the first host device and the communications device.

2. The method of claim 1, further comprising:
storing, by the communications device, a second profile image of the plurality of profile images, wherein the second profile image is based on characteristics of a second host type;
accessing the second profile image from the memory device;
reconfiguring the existing firmware operating on the communications device, without changing the existing firmware to a different firmware, in accordance with a second configuration data object included in the second profile image
exchanging a second message between the communications device and a second networked device via a fieldbus network of a plurality of fieldbus networks, the second message containing a second network data object,
mapping, by the communications device in accordance with the second configuration data object of the second profile image, the second network data object to second host data for a second host device utilizing characteristics of the second host device from the second profile image, wherein the second host device is characterized by the second host type; and
exchanging the second host data with the second host device.

3. The method of claim 1, wherein exchanging the first message over the fieldbus network comprises:
receiving the first message from the first networked device.

4. The method of claim 1, wherein exchanging the first message over the fieldbus network comprises:
sending the first message to the first networked device.

5. The method of claim 1, further comprising:
receiving the first profile image from the first host device.

6. The method of claim 1, further comprising:
receiving the first profile image from a development system.

7. A non-transitory computer-readable storage medium storing computer-executable instructions that, when executed, cause a processor to perform a method comprising:
storing, in a memory device of a communications device, a first profile image of a plurality of profile images, wherein each profile image of the plurality of profile images is based on characteristics of a different host device and includes a different configuration data object, and wherein each profile image is associated with a different host type and wherein each profile image is enabled for reconfiguring an existing firmware operating on the communications device without changing the existing firmware to a different firmware;
accessing, by the communications device, the first profile image from the memory device;
reconfiguring, by the communications device, the existing firmware operating on the communications device, without changing the existing firmware to a different firmware, in accordance with a configuration data object included in the first profile image;
exchanging a first message between the communications device and a first networked device communicatively coupled to the communications device via a network interface, the first message containing a first network data object and wherein the network interface is configured to interface with at least one fieldbus network and configured for exchanging at least the first message with the first network device via the at least one fieldbus network;
mapping, by the communications device in accordance with the configuration data object of the first profile image, the first network data object received from the first networked device to first host data utilizing characteristics of a first host device from the first profile image for exchange with the first host device, wherein the first host device is characterized by a first host type; and
exchanging the first host data between the first host device and the communications device.

8. The non-transitory computer-readable storage medium of claim 7, the method further comprising:
    storing, by the communications device, a second profile image of the plurality of profile images, wherein the second profile image is based on characteristics of a second host type;
    accessing the second profile image from the memory device;
    reconfiguring the existing firmware operating on the communications device, without changing the existing firmware to a different firmware, in accordance with a second configuration data object included in the second profile image
    exchanging a second message between the communications device and a second networked device via a fieldbus network of a plurality of fieldbus networks, the second message containing a second network data object,
    mapping, by the communications device in accordance with the second configuration data object of the second profile image, the second network data object to second host data for a second host device utilizing characteristics of the second host device from the second profile image, wherein the second host device is characterized by the second host type; and
    exchanging the second host data with the second host device.

9. A communications device for an automation and control system including a first host device and a first networked device, the communications device comprising:
    a network interface configured to interface with at least one fieldbus network and configured to exchange a message containing a first network data object with the first networked device via the at least one fieldbus network;
    a memory device configured to store a plurality of profile images including a first profile image, wherein each profile image in the plurality of profile images is associated with a different host type, wherein each profile image in the plurality of profile images is based on characteristics of a different host device and includes a different configuration data object, and wherein each profile image enables reconfiguration of an existing firmware operating on the communications device, without changing the existing firmware to a different firmware; and
    a processing device configured to:
        access the first profile image from the memory device;
            reconfigure the existing firmware operating on the communications device, without changing the existing firmware to a different firmware, in accordance with a configuration data object included in the first profile image;
        map the first network data object received from the first networked device to a first host data utilizing characteristics of the first host device from the first profile image for exchange with the first host device, wherein the first host device is characterized by a first host type; and
        exchange the first host data with the first host device.

10. The communications device of claim 9, wherein:
    the memory device is further configured to store a second profile image of the plurality of profile images, wherein the second profile image is based on characteristics of a second host type; and
    the processing device is further configured to:
        access the second profile image from the memory device;
        reconfigure the existing firmware operating on the communications device, without changing the existing firmware to a different firmware, in accordance with a second configuration data object included in the second profile image;
        receive a second network data object from a second networked device; and
        map the second network data object received from the second networked device to second host data utilizing characteristics of a second host device from the second profile image, wherein the second host device is characterized by a second host type.

11. The communications device of claim 9, wherein the network interface receives the message from the networked device.

12. The communications device of claim 9, wherein the network interface sends the message to the networked device.

13. The communications device of claim 9, wherein the memory device is configured to obtain the first profile image from the first host device.

14. The communications device of claim 9, wherein the memory device is configured to obtain the first profile image from a development system.

15. The communications device of claim 9, wherein the processing device configures the network interface from the configuration data object.

16. The communications device of claim 9, wherein the processing device configures a connection between the first host device and the communications device.

17. The communications device of claim 9, wherein the first host data is formatted in accordance with the configuration data object.

18. The communications device of claim 9, wherein the processing device indicates a location in host memory of the first host device for accessing the first host data in accordance with the configuration data object.

* * * * *